United States Patent [19]

Endo et al.

[11] Patent Number: 5,019,620

[45] Date of Patent: May 28, 1991

[54] ELASTIC CROSSLINKED METATHESIS POLYMER COMPOSITION

[75] Inventors: Zenichiro Endo; Shigeyoshi Hara, both of Iwakuni, Japan

[73] Assignee: Hercules Incorporated, Wilmington, Del.

[21] Appl. No.: 589,292

[22] Filed: Sep. 27, 1990

[30] Foreign Application Priority Data

Oct. 3, 1989 [JP] Japan ................................. 1-257193

[51] Int. Cl.⁵ ................................................. C08K 5/01
[52] U.S. Cl. .................................... 524/485; 526/281; 526/283; 524/484; 524/491
[58] Field of Search ................ 526/281, 283; 524/491, 524/484, 485

[56] References Cited

U.S. PATENT DOCUMENTS 4,900,799 2/1990 Hara et al. ............................ 526/282

Primary Examiner—Paul R. Michl
Assistant Examiner—Yong S. Lee
Attorney, Agent, or Firm—William S. Alexander

[57] ABSTRACT

An elastic crosslinked metathesis polymer composition is disclosed comprised of a copolymer of a norbornene-type compound which metathesis polymerizes to a linear polymer and a norbornene-type compound having a second double bond of similar reactivity which forms a crosslinked polymer, and a hydrocarbon-based extending oil. Norbornene and dicyclopentadiene are typical comonomers. Polymerization is carried out by a RIM or resin injection molding process.

18 Claims, No Drawings

ELASTIC CROSSLINKED METATHESIS POLYMER COMPOSITION

FIELD OF THE INVENTION

The present invention relates to a novel rubber-like crosslinked molded polymer article and a process for producing said article More particularly, the invention relates to a rubber-like crosslinked molded polymer article produced by the simultaneous metathesis polymerization and molding of a metathesis polymerizable monomer having a specific composition in the presence of a specific plasticizer, and a process for producing said molded article.

BACKGROUND OF THE INVENTION

The production of rubber-like polymers has been investigated over the past years. Ring-opening metathesis polymerization of cyclopentene yields a linear polymer known by a common name of polypentenamer having a structure similar to that of poly-1,4-pentadiene, but having slightly lower double bond density in the main chain. The polymer has properties to enable the use as a general-purpose rubber, as can be supposed from its structure.

In order to obtain a rubber having characteristic features, a metathesis polymer of norbornene, which has high ring strain and is easily polymerizable by metathesis polymerization, has been industrially produced. Since the glass transition point of poly(norbornene) is higher than normal room temperature and slightly lower than 40° C., the polymer is not rubbery, but plastic at normal room temperature. However, transition to a rubbery state takes place by slight heating of the polymer and the use of the polymer as a shape-memory polymer has been suggested to take advantage of the transition property. On the other hand, to make the polymer useful as a rubber, a rubber processing oil is added to the polymer to lower the apparent glass transition point and the polymer is crosslinked by conventional vulcanization to obtain a rubber. The rubber produced by the above process is used in various applications as a rubber having low resilience.

On the other hand, a process has been proposed to form a molded polymer article by using a low cost metathesis polymerizable cycloolefin having two metathesis polymerizable cycloolefin groups, for example dicyclopentadiene (DCPD), and carrying out the polymerization and molding of the cycloolefin in a mold (in one step) with a metathesis polymerization catalyst. More particularly, a process has been proposed to obtain a molded polymer article, taking advantage of the fact that a metathesis polymerization catalyst system is composed of two components, i.e. a catalyst component such as a tungsten chloride and an activator component such as an alkylaluminum. Two solutions each containing one of the above catalyst system components and monomer, are quickly mixed and transferred into a mold (for example, U.S. Pat. No. 4,400,340) where polymerization and shaping take place.

Such a process is attractive for producing a crosslinked molded polymer article because the molding can be carried out at a high speed simultaneously with polymerization, using a low-pressure, relatively inexpensive mold. The polydicyclopentadiene produced by this process is generally a plastic having a thermal deformation temperature of 90° C. or higher.

SUMMARY OF THE INVENTION

In accordance with the present invention the above process can be used for producing a molded article of a polynorbornene-type rubber without using a vulcanization step. More particularly, a plasticized rubber-like molded article having crosslinked norbornene units can be produced at a high speed in one step by the metathesis polymerization of a proper mixture of a cycloolefin which forms a linear polymer, e.g. norbornene, and a cycloolefin which forms a polymer having crosslinked structure, e.g. the above-mentioned dicyclopentadiene, in the presence of a high-boiling liquid hydrocarbon. Accordingly, the present invention is a rubber-like crosslinked molded polymer article that comprises (a) a metathesis polymer consisting essentially of
(i) 95–20 mol % of recurring units derived from at least one norbornene derivative expressed by the formula

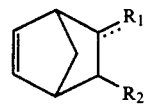

wherein $R_1$ and $R_2$ are, independently, groups selected from hydrogen atoms, halogen atoms, and hydrocarbon groups having a carbon number of 3 or less and optionally containing halogen-substitution and wherein $R_1$ is bonded to the ring by a single or a double bond, and
(ii) 5–80 mol % of recurring units derived from at least one cycloolefin having two strained cycloolefin groups and having a metathesis polymerizability comparable to that of the norbornene derivative of (i); and
(b) at least one high-boiling liquid hydrocarbon or partially halogenated liquid hydrocarbon in an amount sufficient to plasticize said polymer and lower its apparent glass transition point to or below normal room temperature.

DETAILED DESCRIPTION OF THE INVENTION

Additionally, the invention is directed to a process for producing a rubber-like crosslinked molded polymer article by carrying out the metathesis polymerization and molding of (a) a metathesis polymerizable monomer mixture consisting essentially of
(i) 95–20 mol % of at least one norbornene derivative expressed by the formula

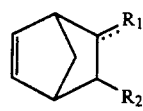

wherein $R_1$ and $R_2$ are, independently, groups selected from hydrogen atoms, halogen atoms, and hydrocarbon groups having a carbon number of 3 or less and optionally containing halogen-substitution and wherein $R_1$ is bonded to the ring by a single bond or a double bond, and
(ii) 5–80 mol % of at least one cycloolefin having two strained cycloolefin groups and having a metathesis polymerizability comparable to that of the norbornene derivative of (i) in the presence of (b) at least one high-boiling liquid hydrocarbon or partially halogenated high-boiling liquid hydrocarbon in an amount sufficient to plasticize the polymer produced by the metathesis polymerization of said monomer mixture and lower its apparent glass transition point to or below normal temperature.

The vulcanization molding of rubber is a special process which generally necessitates a kneading process to incorporate a vulcanizing agent, followed by a vulcanization treatment for a relatively long period in a heated mold. The present invention, by effecting polymerization, crosslinking and molding in a single step makes possible the production of a molded rubber article having characteristic rubber properties in one step at a high speed.

The norbornene compound used in the present invention is expressed by the following formula

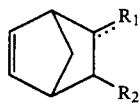

wherein $R_1$ and $R_2$ are as previously mentioned. The bond between the group $R_1$ and the norbornene ring is shown by ---, which indicates that the bond may be a single bond or a double bond.

Preferred examples of the norbornenes include norbornene ($R_1=R_2=H$)
5-methylnorbornene ($R_1=-CH_3$ and $R_2=H$)
5-ethylnorbornene ($R_1=-C_2H_5$ and $R_2=H$)
5-(chloromethyl)norbornene ($R_1=-CH_2Cl$ and $R_2=H$)
5-(ethylidene)norbornene ($R_1=CH-CH_3$ and $R_2=H$)
5-chloronorbornene ($R_1=-Cl$ and $R_2=H$) and
5,6-dimethylnorbornene ($R_1=-CH_3$ and $R_2=-CH_3$).

Among the above compounds, norbornene, 5-methylnorbornene and 5-ethylidenenorbornene, and, especially, norbornene is preferable taking into consideration the availability of raw materials.

As mentioned above, the groups $R_1$ and $R_2$ may be an acyclic olefin group having a carbon number of 3 or less except that such a group must be attached to the norbornene ring via its double bond, i.e. the group cannot be vinyl ($-CH=CH_2$) or propenyl ($-CH=CH-CH_3$ or $-CH_2-C=CH_2$) as these groups act as chain-transfer agents to lower the molecular weight of the polymer during metathesis polymerization.

The norbornene compounds can be produced by the Diels-Alder reaction of cyclopentadiene with corresponding olefins such as ethylene, propylene, butylene, butadiene, pentene-1, allyl chloride, vinyl chloride, butene-(2) and the like. Ethylidenenorbornene can also be produced by the isomerization of vinylnorbornene which is a Diels-Alder addition product of cyclopentadiene and butadiene. Ethylnorbornene can be produced by the partial reduction of vinylnorbornene.

The cycloolefin having two strained cycloolefin groups and having a metathesis polymerizability comparable to that of the norbornene compound is, for example, a compound containing a norbornene group and a second cycloolefin group having a number of ring structure members to cause ring strain wherein the strain of the second cycloolefin group is increased by the condensation of said group with the norbornene ring or one or more other rings between it and the norbornene ring. Typical examples of rings having the number of members to cause straining of the ring are the 4-membered ring and the 5-membered ring, especially the 5-membered ring. In other word, the preferred group is composed of a norbornene which is further condensed with another ring for example a 4-membered ring or 5-membered ring, to form a cycloolefin compound having the above two strained cycloolefin groups.

To assist the understanding of the above, an explanation is shown by the following simplified formulas.

The norbornene ring structure (1) of the following formula (i) is a group containing a cyclopentene ring condensed with another ring at its 3,5-sites.

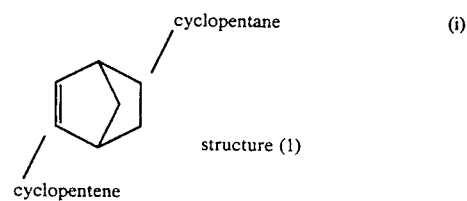

The structure (2) of the following formula (ii) is a group containing a cyclopentene ring condensed with another ring at its 3,4-sites.

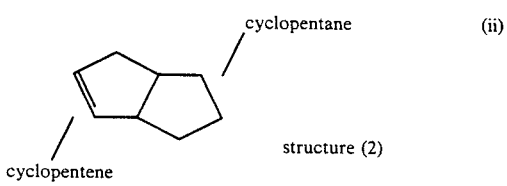

The cycloolefin compound to be used in the present invention is a compound containing two groups selected from either one or both of the structure (1) and (2) expressed by the above formulae (i) and (ii).

The cycloolefin compound may also have short side chains having a carbon number of 1-3 and can, optionally, contain halogen substitution.

Dicyclopentadiene is especially preferable as such cycloolefin compound from the viewpoint of its performance and availability.

As can be seen from the following formula (iii), dicyclopentadiene contains each of the above structures (1) and (2).

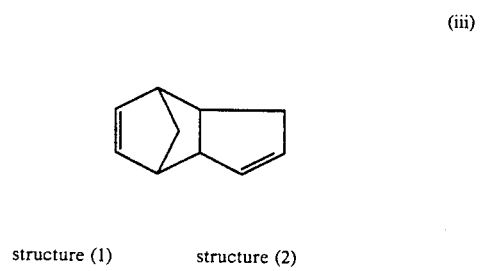

The cycloolefin compounds also include oligocyclopentadienes having a higher degree of condensation than dicyclopentadiene, such as, e.g. tricyclopentadiene. These oligocyclopentadienes are generally produced as a thermal equilibrium mixture with dicyclopentadiene or by thermal polymerization of cyclopentadiene or dicyclopentadiene and, accordingly, they may be used as an equilibrium mixture with dicyclopentadiene. The cycloolefin compounds further include 1,4-,5,8-dimethano-1,4,4a,5,8,8a-hexahydrona-ohthalene, 1,4-,5,8-,9,10-trimethano-1,4,4a,5,8,8a,9,9a,10,10a-decahydroanthracene and the like The above cycloolefin compounds are generally used in combination with dicyclopentadiene.

As mentioned before, dicyclopentadiene is especially preferred as the cycloolefin compound having metathesis polymerizability comparable to that of norbornene.

The term "liquid" in reference to the high-boiling liquid hydrocarbons or partially halogenated compounds used in the present invention means that the material is substantially fluid at room temperature or thereabout. However, the term "liquid" further includes a material which is solid by itself but has extremely high miscibility with the above norbornene--cycloolefin copolymer and acts as a plasticizer when mixed with the copolymer.

The term "high-boiling" means that the rate of evaporation of the hydrocarbon or partially halogenated hydrocarbon from the rubber-like molded polymer article in use is within a practically permissible range. The boiling point of the hydrocarbon depends upon the required practical conditions and is generally at least 200° C., preferably at least 250° C., and most preferably at least 300° C. under normal pressure. Hydrocarbons having carbon number of 12 or more generally meet the above requirement.

Any kind of hydrocarbons such as paraffinic, naphthenic or aromatic hydrOcarbons can be used in the present invention so long as the hydrocarbon meets the above conditiOns. Aliphatic substituted aromatic compounds or aliphatic substituted alicyclic compounds are generally preferred. Aliphatic substituted aromatics are especially preferred.

Materials commercially available as process oils for oil extension of a rubber generally correspond to the above description. Various kinds of process oils such as e.g. paraffin-rich oil, naphthene-rich oil, and aromatic-rich oil are commercially available products that can be employed.

Materials produced for other purposes which meet the requirements of the hydrocarbons of the present invention are also usable in the present process. Certain kinds of thermal media and intermediates for synthetic detergents are examples of such materials. These materials include, among others, triethylbiphenyl, trimethyldiphenylethane, dipropylnaphthalene, dodecylbenzene, didodecylbenzene, dodecylnaphthalene and mixtures thereof.

Partially halogenated hydrocarbons can be used in the present invention because of increased polarity, improved affinity with the metathesis polymer, increased boiling point and, in some casee, ability to impart flame-retardancy depending upon the halogen content. The partially halogenated compounds generally mean compounds obtained by substituting a portion of the hydrogen atoms in the aliphatic, alicyclic or aromatic group by adding halogen to unsaturated bonds in the above compound The halogen is generally chlorine or bromine and the halogen content is usually 15-75 wt. %, especially 25-55 wt. %.

Examples of the partially halogenated compounds are chlorinated paraffin, chlorinated dodecylbenzene, and brominated dodecylbenzene.

The above-mentioned norbornenes, cycloolefin compounds, high-boiling liquid hydrocarbons or partially halogenated liquid hydrocarbons should have the lowest possible content of impurities capable of reacting with the components of a metathesis polymerization catalyst system because these compounds are present together with the metathesis polymerization catalyst system during the metathesis polymerization process.

The sensitivity to impurities is different between the catalyst component and the activator component of the metathesis polymerization catalyst system. Accordingly, in the case of the polymerization and molding process wherein the catalyst component and the activator component are divided into separate solutions that are injected into a mold immediately after mixing, the substantial inhibitory action due to impurities can sometimes be prevented by adding the process oil to one or the other of the two solutions depending upon the kind of impurity existing in the compound and which component will be adversely affected by the impurity.

The ratios of the norbornenes, cycloolefin compounds and hydrocarbons or their halogenated compounds or partially halogenated compounds to be used in the present invention are essentially as follows.

The molar ratio of the norbornene compound to the cycloolefin compound is from 95:5 to 20:80 as mentioned previously. Since the glass transition point of a metathesis copolymer of a norbornene compound and a cycloolefin compound is generally normal room temperature or above, the liquid hydrocarbon or partially halogenated liquid hydrocarbon is used in an amount to reduce the glass transition point to a point not higher than normal room temperature and preferably not higher than the lower limit of the working temperature range anticipated for the specific rubber-like molded polymer article being manufactured. Accordingly, the amount of the liquid hydrocarbon or partially halogenated liquid hydrocarbon depends upon the specific compound, the monomer composition of the polymer, and the working temperature range of the rubber-like molded polymer article.

Addition of too much of the liquid hydrocarbon, or partially halogenated liquid hydrocarbon, sometimes induces blooming of the liquid on the surface of the molded articles and causes practical problems. It is necessary to select the optimum composition by correlating the kinds and amounts of the norbornenes and cycloolefin compounds with the kinds and amounts of the liquid hydrocarbons or partially halogenated liquid hydrocarbons according to the required working temperature range and the properties of the molded article.

The amount of the cycloolefin compound (e.g. DCPD) in the monomer mixture generally has influence upon crosslinking density to exert a remarkable effect on the modulus and elongation of a rubber-like elastomer. The kind of the norbornene compound has an influence upon the properties of a flexible chain segment and, accordingly, upon the modulus, elongation, residual strain, and other properties of the elastomer.

On the other hand, the type of liquid hydrocarbon or partially halogenated liquid hydrocarbon has an influence upon the compatibility with the copolymer of the norbornene compound and the cycloolefin compound. Accordingly, it is necessary to pay attention to the maximum amount of addition to keep the mixture from phase-separation and to the coagulation temperature of the mixture because the phase-separation and coagulation at the lower limit of the working temperature deteriorates the properties of the polymer. Furthermore, the resilience or, conversely, the vibration-damping property, is also influenced by the composition and structure. A molded article rich in ring-structure generally tends to have low resilience.

The optimum composition is selected according to the required properties taking the above-mentioned factors into consideration.

The molar ratio of the norbornene compound to the cycloolefin compound is preferably from 80-20 to 40-60 and the concentration of the liquid hydrocarbon or the partially halogenated liquid hydrocarbon is 10-60 wt. %, more preferably 20-50 wt. % based on the total weight of the metathesis polymerizable components plus the high-boiling hydrocarbon components.

In addition to the above monomers, the composition of the present invention may contain other metathesis polymerizable cycloolefin compounds which do not meet the description cited above as items (a) (i) and (a) (ii) of the main copolymer composition, so long as such compounds have metathesis polymerizability comparable to that of norbornene. The other metathesis polymerizable cycloolefins must be used in an amount not sufficient to deteriorate the properties of the rubber. Examples of the other cycloolefin compound are 1,4-,5,8-dimethano-1,4,4a,5, 6,7,8,8a-octahydronaphthalene, and norbornadiene.

The recurring unit in the polymer of the present invention derived from the norbornene compound has the following structure:

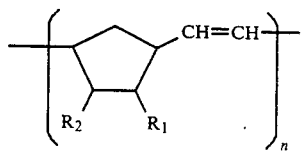

structure A wherein $R_1$ and $R_2$ are the same groups mentioned before.

The recurring unit derived from dicyclopentadiene which is cited as an example of cycloolefin compounds having two strained cycloolefin groups and having a metathesis polymerizability comparable to that of the norbornenes in the polymer of the present invention has, for example, the structure of the following formulas.

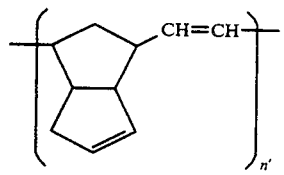

structure B and

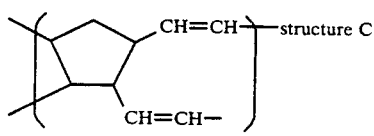

structure C

The recurring unit derived from a cycloolefin compound other than dicyclopentadiene, having two strained cycloolefin groups and having a metathesis polymerizability comparable to that of the norbornenes in the polymer of the present invention similarly has the structure which can be easily determined from the structure of the monomer.

The polymer of the present invention contains linear segments resulting from repeating unite of A and B with periodic crosslinks resulting from the structure C and is plasticized with the liquid hydrocarbons or partially halogenated liquid hydrocarbons to form a rubber-like molded article.

The catalyst component of the metathesis polymerization catalyst system used in the production of the molded polymer article of the present inventiOn are salts such as halides of tungsten, rhenium, tantalum, molybdenum and the like with tungsten compounds being especially preferred. Among tungsten compounds are preferred tungsten halides, tungsten oxyhalides and the like. More particularly, tungsten hexachloride and tungsten oxychloride, etc., are preferred. However, such tungsten salt compounds undesirably initiate cationic polymerization substantially immediately when added directly to said monomer. It is, therefore, preferable that the tungsten salt compounds be previously suspended in an inert solvent such as benzene, toluene or chlorobenzene and solubilized by the addition of a small amount of an alcoholic compound or a phenolic compound.

A Lewis base or a chelating agent is preferably added to the catalyst in an amount of about 1-5 mol per 1 mol of the tungsten compound in order to prevent undesirable polymerization. Those additives may include acetylacetone, acetoacetic acid alkyl esters, tetrahydrofuran, benzonitrile and the like.

Following such treatment, the monomer solution (Solution A) containing the catalyst component has sufficiently high stability for practical use. Ammonium tungstate compounds or ammonium molybdate compounds may also be used. These compounds do not require the solubilization treatment or the inactivation step as they are substantially less active than the halide salts.

The activator components of the metathesis polymerization catalyst system include organo-metallic compounds chiefly comprising alkylated compounds of metals of group I—group III in the periodic table, preferably, alkylaluminum compounds, alkylaluminum halide compounds and trialkyltin hydrides such as diethylaluminum chloride, ethylaluminum dichloride, trioctylaluminum, dioctylaluminum iodide and tributyltin hydride. The organometallic compound used as the activator component i.e. dissolved in the monomer mixture to form a monomer solution containing activator component (Solution B).

According to the present invention, in principle, the molded polymer articles are produced by mixing the Solution A with the Solution B. The polymerization reaction, however, starts very rapidly when the above-mentioned composition is used and, consequently, undesirable initiation of hardening often occurs before the mold is completely filled with the mixed solution. In order to overcome the problem, it is preferable to use a polymerization moderating agent to delay onset of polymerization.

As such moderators are generally used Lewis bases, particularly, ethers, esters, nitriles and the like. Examples of the moderators include ethyl benzoate, butyl ether, diglyme and the like. Such moderators are generally added to the solution containing the activator component comprising organometallic compound. When using the ammonium tungstate or molybdenum compounds, an alkyl alcohol is generally employed as the moderator.

When a tungsten compound is used as the catalyst component, the ratio of the tungsten compound in the metathesis polymerization catalyst system to the above-mentioned monomers is about 1000:1 - about 15000:1, and preferably about 2000:1 on molar basis. When an alkyl-aluminum compound is used as the activator component, the ratio of the aluminum compound to the above-mentioned monomers is about 100:1 - about 2000:1 and preferably around a ratio of about 200:1 - about 500:1 on molar basis. The amount of the moderator may be adjusted by experiments depending upon the amount of the catalyst system.

In order to decrease the residual monomer content, a small amount of an active halogen compound such as trichloromethyltoluene, ethyl trichloroacetate, isophthaloyl chloride or an acid anhydride such as benzoic anhydride may be added in the production of the rubber-like molded polymer article of the present invention. The residual monomer may have the action of a plasticizer in the polymer molded article of the present invention, however, the content of the residual monomer is preferably as low as possible because of the characteristic smell and volatility of monomers of the class employed.

A variety of additives may be used practically in the rubber-like crosslinked polymer molded article of the present invention to improve or to maintain characteristics of the molded articles. The additives include fillers, pigments, antioxidants, light stabilizers, flame retardants, macromolecular modifiers and the like. These additives are to be added to the starting solutions, since they cannot be added after the solutions are polymerized to the crosslinked molded polymer article.

Additives may be added to either one or both of Solution A and the Solution B. The additives should be substantially unreactive with the highly reactive catalyst component, activator component and other components of the solutions to avoid practical troubles such as an inhibitory action on polymerization. If a reaction between the additive and the catalyst component or the activator component is unavoidable but does not essentially inhibit the polymerization, the additives can be mixed with a proper combination of the monomers, the above liquid hydrocarbons or partially halogenated liquid hydrocarbons to prepare a third solution, which is mixed with the first and second solutions immediately before polymerization. When the additive is a solid filler forming gaps which can be filled sufficiently with both solutions immediately before or during the polymerization reaction, the mold may be filled with the filler prior to charging the reactive solutions into the mold.

The fillers used as additives are preferably those effective in improving abrasion resistance and fatigue resistance. They include carbon black, fine silica particles and the like. In some cases, the fillers are surface-treated e.g. with a so-called silane coupler as required. Furthermore, the filler may be a fibrous reinforcing material. Such fibrous reinforcing materials include glass fiber, carbon fiber, polyester fiber, aramid fiber, nylon fiber and the like. These fibers may be used in the form of woven fabric, mat, nonwoven fabric and the like.

The rubber-like crosslinked molded polymer article used in the present invention may also contain an antioxidant. Preferably, a phenolic- or amine-antioxidant is added to the solution in advance. Examples of the antioxidants include 2,6-t-butyl-p-cresol, N,N'-diphenyl-p-phenylenediamine, and tetrakis[methylene- (3,5-di-t-butyl-4-hydroxycinnamate)]methane.

The reactive solutions A and B for the production of the crosslinked molded polymer article by the present invention are preferably introduced into the mold in the form of laminar flow to prevent the inclusion of bubbles. To realize the laminar flow, a proper viscosity corresponding to the injection speed is necessary and the addition of a thickener to either one or both of Solutions A and B is frequently required.

The material usable as the above thickener is a polymer which is soluble in the monomer or in the liquid hydrocarbon or partially halogenated liquid hydrocarbon, is free from inhibitory action to metathesis polymerization, does not cause deterioration of the characteristic properties of the article and, preferably, imparts desirable properties to the article. The polymer usable for the above purpose is preferably a non-crosslinked hydrocarbon elastomer such as styrene-butadiene-styrene triblock rubber, styrene-isoprene-styrene triblock rubber, polybutadiene, polyisoprene, butyl rubber, ethylene-propylene-diene terpolymer and the like.

As described above, the molded polymer articles of the present invention are prepared by simultaneous polymerization and molding The molding method includes, as mentioned above, a resin injection process comprising the proper mixing of a catalyst, a raw material monomer and a plasticizer or, more preferably, mixing of the previously prepared solutions A and B with a static mixer or the like and the injection of the produced premix into a mold and a RIM process comprising the impingement mixing of the solution A and the solution B containing divided catalyst system in a head and the immediate injection of the mixture into the mold. The RIM process is used in general.

In both of RIM process and resin injection process, the mixture can be introduced into the mold under relatively low pressure, so that an inexpensive mold is usable. The temperature in the mold increases rapidly by the heat of reaction upon the start of the polymerization reaction in the mold, and the polymerization reaction is completed in a short time. The molded article of the present invention can be removed easily from the mold without using a releasing agent.

The rubber-like crosslinked molded polymer article of the present invention can be produced, as mentioned above, in one step at high speed by the simultaneous polymerization and molding of a monomer.

Conventional molding of a rubber generally necessitates a kneading step to blend various additives, including a crosslinker, into a green rubber polymer and a separate step to vulcanize and mold the kneaded mixture. The molding efficiency is not high compared with conventional molding process of plastics. The present invention enables the production of a rubber-like molded article from a monomer in one step at high speed.

For the process of such rubber-like molded article, it is already known that a polyurethane rubber can be formed in one step from a prepolymer. Since polyurethane elastomer generally necessitates heat-treatment after molding, the process of the present invention, requiring no heat-treatment, has higher efficiency. The rubber properties of the polymer of the present invention are considerably different from those of the polyurethane rubber as can be supposed from the difference in structures. Although polyurethane is preferable in some uses, the method of the present invention is superior for the production of a low-resilient and low-hygroscopic hydrocarbon rubber and the product is usable in a wide variety of applications making use of these properties.

The molded articles of the present invention are suitable especially as large-sized vibration-damping material or cushioning material having complicated shapes.

Since the rubber-like molded article of the present invention is elastic, it can be easily released forcibly from a mold even if the mold has an overhang. Thus, an article having complicated shape can be produced by the process.

The invention described herein is illustrated in detail by the following Examples. These examples are presented solely for explanation and are not intended to limit the scope of the invention.

EXAMPLES 1-10

Dicyclopentadiene, ethylidenenorbornene and norbornene used in the examples were those of commercially available high-purity grades.

5-Chloronorbornene and 5-methylnorbornene were produced by carrying out the Diels-Alder reaction of cyclopentadiene with vinyl chloride and propylene respectively in an autoclave and purifying the reaction products by distillation. The plasticizers were DUTREX 729HP (aromatic rich) SHELL FLEX 371N (napthene rich) and SHELL FLEX 210 (paraffin rich). All of these are process oils marketed by Shell Oil Co. These oils were used without purification.

20 Parts by weight of tungsten hexachloride was added to 70 parts by volume of anhydrous toluene under nitrogen stream. The obtained mixture was added to a solution consisting of 21 parts by weight of nonylphenol and 16 parts by volume of toluene to obtain a catalyst solution containing 0.5 M of tungsten. The solution was purged with nitrogen overnight to remove the hydrogen chloride gas formed by the reaction of tungsten hexachloride and nonylphenol. A catalyst solution for polymerization was prepared by adding 1 part by volume of acetylacetone to 10 parts by volume of the solution produced by the above procedure.

100 Parts by weight of a monomer mixture composed of a purified norbornene compound and purified dicyclopentadiene and having a composition shown in Table 1 was added with 2 parts by weight of methylene-bis-(4-hydroxy-3,5-di-t-butyl benzene) as an oxidation stabilizer. The obtained solution was added to the above catalyst solution for polymerization in an amount to give a tungsten content of 0.0001 M and a dichlorodiphenylmethane content of 0.0075 M. A process oil was added oil at a ratio shown in Table 1 to obtain a catalyst component solution (Solution A).

A mixed solution of activator for polymerization was prepared by mixing trioctylaluminum, dioctylaluminum iodide and dimethyl ether of ethylene glycol at molar ratios of 85:15:100.

The mixed solution was added to 100 parts by weight of a mixture consisting of the purified norbornene compound and the purified dicyclopentadiene in an amount to give an aluminum content of 0.003 M and a process oil was added to the mixture at a ratio shown in Table 1 to obtain an activator component solution (Solution B).

The mixing ratios of the mixture of the purified norbornene compound and the purified dicyclopentadiene are shown in Table 1.

A molded block of a metathesis polymerized crosslinked polymer having dimensions of 60 mm x 60 mm and a thickness of about 40 mm was produced from the above-prepared solution A and solution B with a small reaction injection molding machine. The liquid temperature and the mold temperature in the injection were 30° C. and 70° C., respectively.

Right circular cylindrical specimens having thickness of 12.70±0.13 mm and diameter of 29.0 mm were cut from the above molded product and the compression set of each specimen was measured under the heat-treatment condition of 70 1° C. and 22 hours in accordance with JIS K6301. The results are also shown in Table 1.

The Table 1 shows that the rubber-like molded articles produced from a monomer in one step at high speed using the solutions having the compositions of Examples 1-10 have small residual strain caused by compression under heating and that the articles can be used in a state subjected to static compression or shearing force.

Comparison of the Examples 1, 4 and 5 shows that the hardness of the obtained rubber-like molded article decreases by increasing the content of the high-boiling liquid hydrocarbon. Accordingly, the hardness of the rubber-like molded article can be arbitrarily selected.

The resilience of the molded article is highly dependent upon the kind of the high-boiling liquid hydrocarbon. Comparison of the Examples 1, 7 and 9 shows that the resilience decreases in the order DUTREX 729HP, SHELL FLEX 371N and SHELL FLEX 210. This decrease corresponds to decreasing cyclic structure content in the oils.

It is clear from the above results that a variety of crosslinked rubber-like molded articles can be produced in one step at high speed by varying the ratio of a norbornene compound and a cycloolefin compound having two strained cycloolefin groups to control the crosslinking density and by varying the type of the high-boiling liquid hydrocarbon or partially hydrogenated liquid hydrocarbon to be used in the process.

TABLE 1

| | Example No. | | | | |
|---|---|---|---|---|---|
| | 1 | 2 | 3 | 4 | 5 |
| Norbornene Compound* (mol %) | Norbornene 80 | Norbornene 40 | Ethylidene-norbornene 70 | Norbornene 80 | Norbornene 80 |
| Cycloolefin compound having 2 strained cycloolefin groups* (mol %) | Dicyclo-pentadiene 20 | Dicyclo-pentadiene 60 | Dicyclo-pentadiene 30 | Dicyclo-pentadiene 20 | Dicyclo-pentadiene 20 |
| High-boiling liquid hydrocarbon** (wt. %) | DUTREX 729 HP 30 | DUTREX 729 HP 30 | DUTREX 729 HP 30 | DUTREX 729 HP 50 | DUTREX 729 HP 70 |
| Permanent set (%)*** | 26 | 38 | 27 | 35 | 36 |

TABLE 1-continued

| | Example No. | | | | |
|---|---|---|---|---|---|
| | 1 | 2 | 3 | 4 | 5 |
| Norbornene Compound* (mol %) | Norbornene 50 | Norbornene 80 | 5-Chloro norbornene 60 | Norbornene 80 | 5-Methyl norbornene 50 |
| Cycloolefin compound having 2 strained cycloolefin groups* (mol %) | Dicyclo-pentadiene 40 Cyclopentadiene Trimer 10 | Dicyclo-pentadiene 20 | Dicyclo-pentadiene 40 | Dicyclo-pentadiene 20 | Dicyclo-pentadiene 50 |
| High-boiling liquid hydrocarbon** (wt. %) | DUTREX 729 HP 70 | SHELL FLEX 210 30 | SHELL FLEX 210 30 | SHELL FLEX 371N 30 | SHELL FLEX 371N 30 |
| Permanent set (%)*** | 27 | 24 | 20 | 26 | 29 |

*Molar ratio of each compound based on 100 mol of the sum of the norbornene compound and the cycloolefin compound having two strained cycloolefin groups.
**Weight % of the high-boiling liquid hydrocarbon based on 100 parts by weight of the sum of the norbornene compound, the cycloolefin compound having two strained cycloolefin groups and the high-boiling liquid hydrocarbon.
***Measured in accordance with JIS K 6301: Heat-treatment condition, at 70° C. for 22 hours.

I claim:

1. A rubber-like crosslinked molded polymer article that comprises
   (a) a metathesis polymer consisting essentially of
      (i) 95–20 mol % of recurring units derived from at least one norbornene derivative expressed by the formula

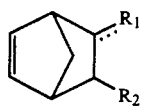

wherein $R_1$ and $R_2$ are, independently, groups selected from hydrogen atoms, halogen atoms, and hydrocarbon groups having a carbon number of 3 or less and optionally containing halogen-substitution and wherein $R_1$ is bonded to the ring by a single or a double bond, and
      (ii) 5–80 mol % of recurring units derived from at least one cycloolefin having two strained cycloolefin groups and having a metathesis polymerizability comparable to that of the norbornene derivative of (i); and
   (b) at least one high-boiling liquid hydrocarbon or partially halogenated liquid hydrocarbon in an amount sufficient to plasticize said polymer and lower its apparent glass transition point to or below normal room temperature.

2. The molded article of claim 1 wherein the cycloolefin having two strained cycloolefin groups and having a metathesis polymerizability comparable to that of the norbornene derivative is dicyclopentadiene.

3. The molded article of claim 2 wherein the norbornene derivative is norbornene.

4. The molded article of claim 2 wherein the norbornene derivative is 5-chloronorbornene.

5. The molded article of claim 2 wherein the norbornene derivative is 5-ethylidenenorbornene.

6. The molded article of claim 2 wherein the ratio of the norbornene derivative to the cycloolefin having two strained cycloolefin groups and having metathesis polymerizability comparable to that of the norbornene derivative is between about 80 to 20 and 40 to 60.

7. The molded article of claim 1 wherein the concentration of the high-boiling hydrocarbon or partially hydrogenated hydrocarbon component is 10 to 60 weight percent based on the total weight of metathesis polymerizable components plus the high-boiling components.

8. The molded article of claim 2 wherein the concentration of the high-boiling hydrocarbon or partially halogenated hydrocarbon content is 10 to 60 weight % based on the total weight of the metathesis polymerizable components plus the high-boiling components.

9. The molded article of claim 8 wherein the norbornene derivative is selected from the class consisting of norbornene, 5-chloronorbornene, and 5-ethylidene norbornene.

10. A process for producing a rubber-like crosslinked molded polymer article by carrying out the metathesis polymerization and molding of
   (a) a metathesis polymerizable monomer mixture consisting essentially of (i) 95–20 mol % of at least one
      norbornene derivative expressed by the formula

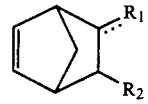

wherein $R_1$ and $R_2$ are, independently, groups selected from hydrogen atoms, halogen atoms, and hydrocarbon groups having a carbon number of 3 or less and optionally containing halogen-substitution and wherein $R_1$ is bonded to the ring by a single bond or a double bond, and
      (ii) 5–80 mol % of at least one cycloolefin having two strained cycloolefin groups and having a metathesis polymerizability comparable to that of the norbornene derivative of (i) in the presence of
   (b) at least one high-boiling liquid hydrocarbon or partially halogenated high-boiling liquid hydrocarbon in an amount sufficient to plasticize the polymer produced by the metathesis polymerization of said monomer mixture and lower its apparent glass transition point to or below normal temperature.

11. The process of claim 10 wherein the cycloolefin having two strained cycloolefin groups and having a metathesis polymerizability comparable to that of the norbornene derivative is dicyclopentadiene.

12. The process of claim 11 wherein the norbornene derivative is norbornene.

13. The process of claim 11 wherein the norbornene derivative is 5-chloronorbornene.

14. The process of claim 11 wherein the norbornene derivative is 5-ethylidenenorbornene.

15. The process of claim 11 wherein the ratio of the norbornene derivative to the cycloolefin having two strained cycloolefin groups and having metathesis polymerizability comparable to that of the norbornene derivative is between about 80 to 20 and 40 to 60.

16. The process of claim 10 wherein the concentration of the high-boiling hydrocarbon or partially hydrogenated hydrocarbon component is 10 to 60 weight percent based on the total weight of metathesis polymerizable components plus the high-boiling components.

17. The process of claim 11 wherein the concentration of the high-boiling hydrocarbon or partially halogenated hydrocarbon content is 10 to 60 weight % based on the total weight of the metathesis polymerizable components plus the high-boiling components.

18. The process of claim 17 wherein the norbornene derivative is selected from the class consisting of norbornene, 5-chloronorbornene, and 5-ethylidene norbornene.

* * * * *

UNITED STATES PATENT AND TRADEMARK OFFICE
CERTIFICATE OF CORRECTION

PATENT NO. : 5,019,620         Page 1 of 2

DATED : May 28, 1991

INVENTOR(S) : Zenichiro Endo; Shigeyoshi Hara (Case 4)

It is certified that error appears in the above-identified patent and that said Letters Patent is hereby corrected as shown below:

Col. 4, between lines 17-14 of structure 1
" 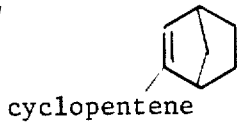 cyclopentane should be    "  cyclopentane
   cyclopentene                                      cyclopentene
             structure (1) "                                  structure (1)    "

Col. 4, between lines 30-38 structure (2)
" 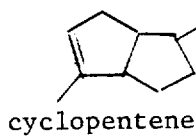 cyclopentane should be    " 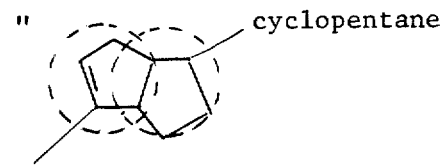 cyclopentane
   cyclopentene                                      cyclopentene             "
             structure (2) "                                  Structure (2)

Col. 4, between lines 30-38 structure 1 & 2
"                          should be              " 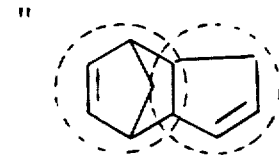
                                                                       "
                                                       structure 1    structure 2
   structure (1)   structure (2)

UNITED STATES PATENT AND TRADEMARK OFFICE
CERTIFICATE OF CORRECTION

PATENT NO. : 5,019,620

DATED : May 28, 1991

INVENTOR(S) : Zenichiro Endo; Shigeyoshi Hara (Case 4)

It is certified that error appears in the above-identified patent and that said Letters Patent is hereby corrected as shown below:

Col. 5, line 4
"...hexahydrona-ohthalene,"   should be "...hexahydronaphthalene,"

Col. 5, line 57 "casee," should be "cases,"

Col. 5, line 63 "compound The halogen" should be "compound. The halogen"

Col. 7, line 60

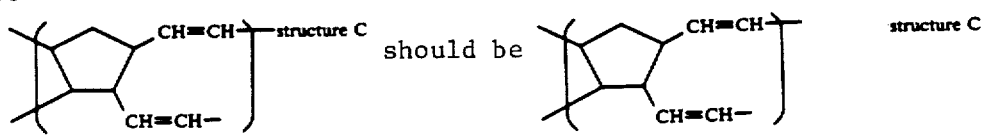

Signed and Sealed this

Thirteenth Day of October, 1992

*Attest:*

DOUGLAS B. COMER

*Attesting Officer*      *Acting Commissioner of Patents and Trademarks*